United States Patent [19]

Caldwell

[11] Patent Number: 5,317,509
[45] Date of Patent: May 31, 1994

[54] REGULAR EXPRESSION FACTORING FOR SCANNING MULTIBYTE CHARACTER SETS WITH A SINGLE BYTE AUTOMATA MACHINE

[75] Inventor: Jeffrey B. Caldwell, Sunnyvale, Calif.

[73] Assignee: Hewlett-Packard Company, Palo Alto, Calif.

[21] Appl. No.: 822,911

[22] Filed: Jan. 21, 1992

[51] Int. Cl.$^5$ ............................................. G06F 11/00
[52] U.S. Cl. ............................ 364/419.08; 395/700; 395/200
[58] Field of Search ..................... 364/419, 280.4, 488, 364/489; 395/700

[56] References Cited

U.S. PATENT DOCUMENTS

| | | | |
|---|---|---|---|
| 4,989,145 | 1/1991 | Kyushima | 364/419 |
| 4,991,094 | 2/1991 | Fagan et al. | 364/419 |
| 5,113,342 | 5/1992 | Zamora | 364/419 |

*Primary Examiner*—Roy M. Enval, Jr.
*Assistant Examiner*—Khai Tran
*Attorney, Agent, or Firm*—Alan H. Haggard; Roland I. Griffin

[57] ABSTRACT

The present invention provides a system and method for building a lexical analyzer that can scan multibyte character sets. The present invention factors regular expressions that contain multibyte characters, so that a single byte finite state automata can be constructed. In particular, the present invention provides a computer-based system and method for tokenizing a source program written in a programming language that is represented by both single byte values and two byte values. The present invention includes a mechanism for building a lexical analyzer that is configured to accept an input specification. The input specification typically includes a regular expression(s) and a corresponding associated action(s). The present invention also including a mechanism for factoring the regular expression(s), if the regular expression(s) contains at least one two byte character, into a regular expression(s) containing only single byte characters. The present invention will result in both a significantly smaller lexical analyzer which uses substantially less memory and a lexical analyzer which easily recognizes a heterogeneous input stream of single and two byte characters.

21 Claims, 7 Drawing Sheets

REGULAR EXPRESSION FACTORING FOR SCANNING MULTIBYTE CHARACTER SETS WITH A SINGLE BYTE AUTOMATA MACHINE

BACKGROUND OF THE INVENTION

1. Field of the Invention

The present invention relates generally to the field of compiler design, and more particularly to the construction of lexical analyzers that can efficiently accept multibyte character sets.

2. Discussion of Related Art

Lexical Analyzers are one of the cornerstones of compiler creation and are used in many areas of computer science for a multitude of applications. The identification of words and delimiters is a necessary task for any language processing task. The main task of a lexical analyzer is to read input characters from a source program and produce as an output a sequence of tokens. This process is also called "tokenization" because the process generates word and punctuation tokens.

In the past, lexical analyzers have been built to recognize only characters that fall within the realm of single byte character sets. Single byte character sets are sufficient for representing most English and European languages. However, languages from the Pacific Rim, such as the Kanji character set used in Japan, require two bytes to represent the multitude of characters.

Building a lexical analyzer for a character set generally requires tables to be constructed with a number of entries approximately equal to the number of different characters that are to be recognized. In a single byte character set this requires on the order of 256 entries in its tables (which is two raised to the power of eight). Following this logic, a lexical analyzer for a two byte character set would require on the order of 65,536 entries in its tables (which is two raised to the power of sixteen). This is a prohibitively large amount of space that will be needed to build and run the lexical analyzer. Therefore, it is readily apparent that a more efficient system and method is needed in order to recognize character sets that can only be represented with two bytes of data.

SUMMARY OF THE INVENTION

In view of the foregoing, the present invention provides a system and method for building a lexical analyzer that can scan multibyte character sets. The present invention factors regular expressions that contain multibyte characters, so that a single byte finite state automata can be constructed.

In particular, the present invention provides a computer-based system and method for tokenizing a source program written in a programming language that is represented by both single byte two byte values. The present invention includes generating means for building a lexical analyzer. The generating means is configured to accept an input specification. The input specification typically includes a regular expression(s) and a corresponding associated action(s). The present invention also includes factoring means for factoring a regular expression(s), if the regular expression(s) contains at least one two byte character, into a regular expression(s) containing only single byte characters.

The present invention then builds a C program of a lexical analyzer based on the single byte representation. The lexical analyzer is compiled into an efficient finite state automata for the factored regular expression. Subsequently, a sequence of characters is entered into the compiled lexical analyzer and the characters are checked in relation to the factored regular expression to construct a set of tokens and execute the associated actions.

The present invention will result in both a significantly smaller lexical analyzer which uses substantially less memory and a lexical analyzer which easily recognizes a heterogeneous input stream of single and two byte characters.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE PREFERRED EMBODIMENT

I. Environment of the Present Invention

Figure 1:
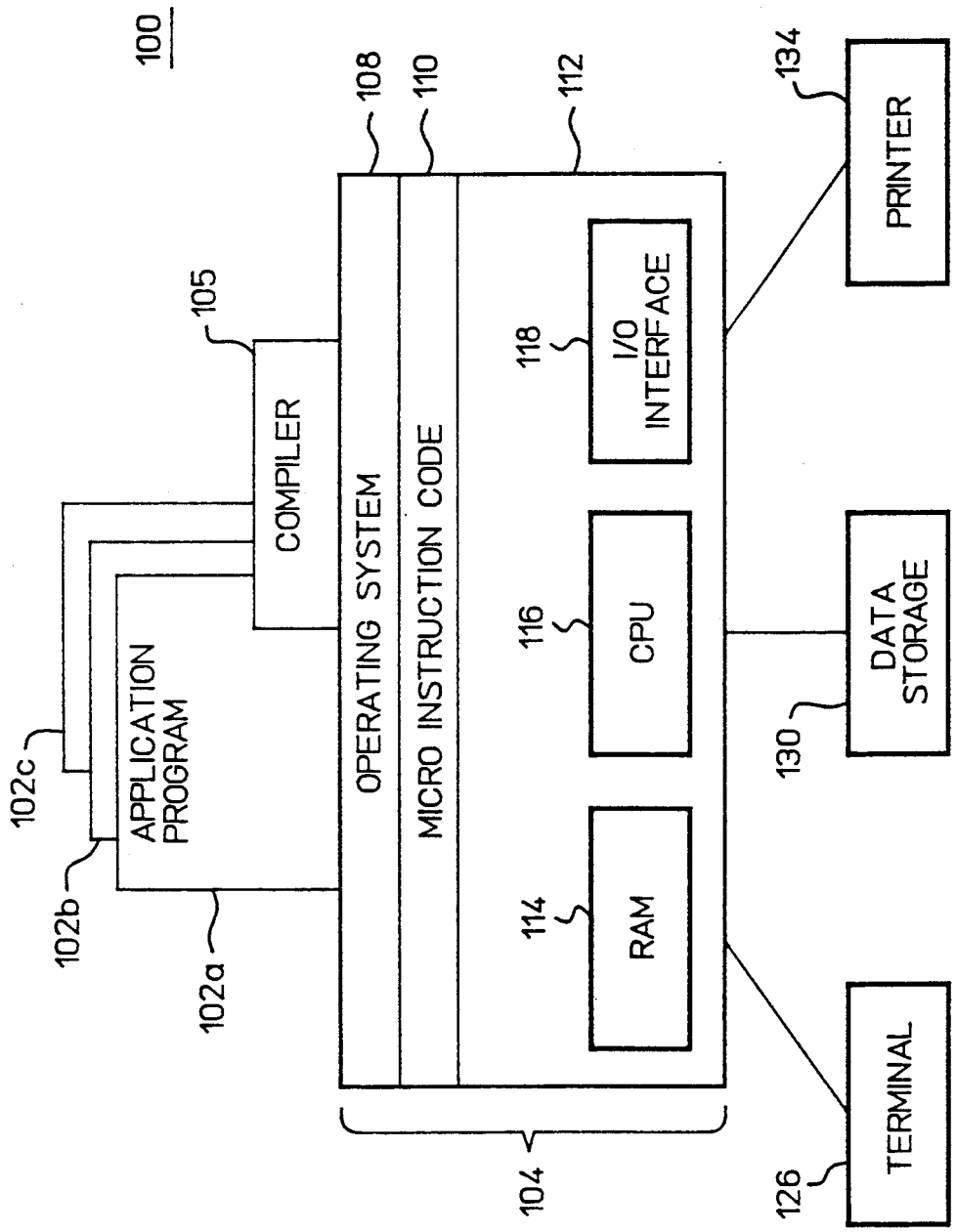
FIG. 1 is a general hardware environment 100 in which a preferred embodiment of the present invention may operate.

FIG. 1 illustrates a general hardware environment in which a preferred embodiment of the present invention may operate. The environment 100 of the present invention includes application programs 102a, 102b, and 102c. One specific type of application program is a compiler 105. A compiler is based on a sequence of transformations that preserve the operational meaning of a program, but not necessarily all the information in it, nor even the exact sequence of operations requested in the source program. Compiler 105 is configured to transform a source program into optimized executable code, or more generally, from source code to object code. Compiler 105 operates on a computer platform 104.

Computer platform 104 includes a hardware unit 112, which includes potentially multiple central processing units (CPU) 116, a random access memory (RAM) 114, and an input/output interface 118. Computer platform 104 includes an operating system 108, and may include micro-instruction code 110. Various peripheral components may be connected to computer platform 104, such as a terminal 126, a data storage device 130, and a printing device 134.

In a preferred embodiment of the present invention, computer platform 104 is any personal computer, workstation, or mainframe computer. The operating system 108 may be any operating system compatible with the computer platform 104 being utilized.

Moreover, in the preferred embodiment of the present invention, compiler 105 utilizes the LEX and YACC utilities available in the UNIX operating system, and contains subroutines written in the C programming language. The LEX utility is modified to accept characters that are represented by two bytes of data. One skilled in the art would be in a position to readily make the minor modifications to the LEX utility necessary to incorporate the teachings of the present invention. For more information on the LEX utility see Lesk et al., "Lex—A Lexical Analyzer Generator," *Computer Science Technical Reports*, 39, Bell Labs, Murray Hill, N.J. (October 1975).

Figure 2A:
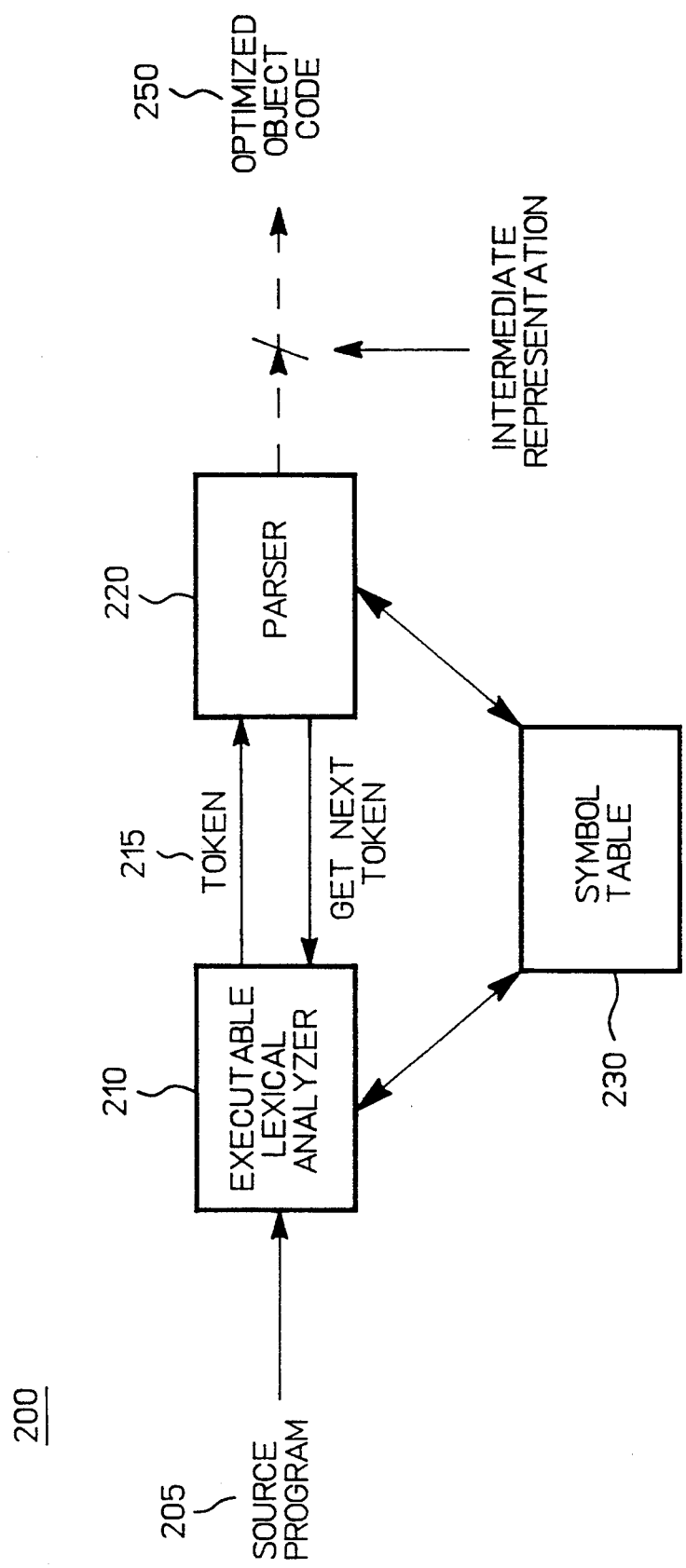
FIG. 2(a) is a detailed illustration of one particular phase of compiler 105.

Referring to FIG. 2(a), a more detailed illustration of a particular phase of the compiler 105 is shown. The present invention is essentially concerned with the "front end" of compiler 105. The front end usually includes, for example, mechanisms for providing lexical analysis, parsing, and intermediate code generation.

Typically, a source program 205 is entered into the system 200 and optimized object code 250 is produced. A lexical analyzer 210 is the first phase of compiler 105. Its main task is to read the input characters from the source program 205 and produce as an output a sequence of tokens 215 that parser 220 uses for syntax analysis. This interaction, summarized in FIG. 2(a), is commonly implemented by making the lexical analyzer 210 be a subroutine or coroutine of parser 220. Upon receiving a "get next token" command from the parser, the lexical analyzer reads input characters until it can identify the next token 215. Lexical analyzers are sometimes divided into a cascade of two phases, the first called "scanning," and the second "lexical analysis." The scanner is responsible for doing simple tasks, while the lexical analyzer proper performs the more complex operations.

The token sequence 215 emitted by lexical analyzer 210 is next processed by parser 220. Parser 220 determines the underlying structure of the program. Until parser 220 is reached, the tokens 215 have been collected with little or no regard to their context within the program as a whole. Parser 220 considers the context of each token 215 and classifies groups of tokens into larger entities such as declarations, statements, and control structures. The product of the parser usually is an abstract-syntax tree. A tree is a useful representation of a program or program segment, inasmuch as it facilitates several subsequent transformation designed to minimize the number of machine instructions needed to carry out the required operations.

In addition to the structural interpretation, a symbol table 230 is constructed and managed. The symbol table provides an association of identifiers appearing in the source program 205 with various attributes.

Those skilled in the art will readily understand the equivalents to the above described structures.

II. Lexical Analyzer Overview

A more detailed description of some of the basic concepts discussed in this section is found in a number of references, including Aho et al., *Compilers: Principles, Techniques, and Tools*, Addison-Wesley (1986) and Barret et al., *Compiler Construction, Theory and Practice*, Science Research Associates (1986), which are hereby incorporated by reference herein in their entirety.

The elements of a programming language (e.g., C, Fortran, APL) are its alphabet, its grammar, and its semantics. The alphabet is a finite set of characters of which sentences in the programming language are composed. The grammar is a set of structural rules defining the legal contexts of tokens in sentences. The semantics is a set of rules that define the operational effect of any program written in the programming language when translated and executed on some machine.

Every source program consists of some sequence of characters drawn from the alphabet of the programming source language. Typically, certain easily recognizable sequences of characters are collected together to form tokens. For example, tokens might correspond to individual words, digits, symbols, and/or blank spaces in a particular language, such as English or Japanese. The tokens form sentences with the use of a structured set of rules (i.e., the grammar).

A recognizer for a programming language is a program that takes as input a string X and enters "yes" if X is sentence of the language and "no" otherwise. Patterns or sequences of characters are specified by a regular expression. In brief, a regular expression defines a set. Regular expressions are compiled into a recognizer by constructing a generalized transition diagram called a finite-state automata (FSA). A FSA can be deterministic (DFA) or non-deterministic (NDFA), where "non-deterministic" means that more than one transition out of a state may be possible on the same input symbol. FSA's are usually designed to analyze (recognize) strings from a particular programming language. The sentences would be broken down into tokens by the FSA (i.e., the lexical analyzer 210) and used as an input into parser 220 to determine whether the elements of the sentence were of a specified legal form.

Figure 2B:
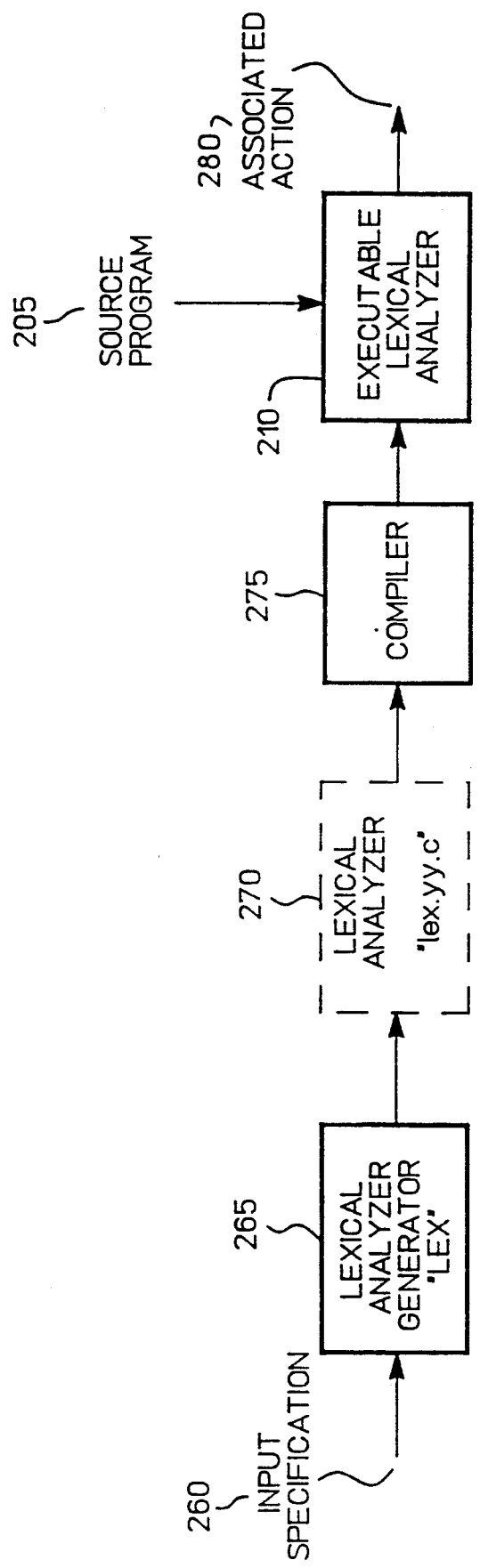
FIG. 2(b) is a detailed illustration of how lexical analyzer 210 of the present invention is generated.

FIG. 2(b) illustrates how lexical analyzer 210 of the present invention is generated. Initially, an input specification 260 consisting of desired regular expressions and associated actions are entered into the lexical analyzer generator 265. An associated action is a particular action (e.g., print "a space") that is performed if a set of characters satisfy the requirements of the regular expression.

The present invention is utilized within lexical analyzer generator 265. As discussed above, the preferred embodiment of the present invention uses the LEX utility as its lexical analyzer generator 265. It is contemplated that other lexical analyzer generators will be enhanced with the present invention. There is nothing inherent in the LEX utility that makes it more adaptable to being interfaced with the system and method of the present invention.

Lexical analyzer generator 265 produces as its output a lexical analyzer 270, which is represented in the LEX utility as lex.yy.c. In the case of LEX, lexical analyzer 270 is a C source file that can be compiled to create an executable lexical analyzer. A compiler 275 for LEX 265 can generate an efficient finite state automata recognizer for the regular expression. Thus, the C source file is compiled by compiler 275 into a executable lexical analyzer 210 (hereinafter lexical analyzer 210). Once again, lexical analyzer 210 forms part of the compiler 105, as shown in FIG. 1(a).

Finally, the source program 205 which consists of a sequence of characters is entered into lexical analyzer 210. In operation, lexical analyzer 210 waits for input characters from the source program 205. When it recognizes a set of input characters matching one of the regular expressions in the input specification 260, it executes the corresponding associated action. This continues until the program is terminated or EOF is encountered. Typically, the output 280 from lexical analyzer 210 is a set of tokens.

Those skilled in the art will readily appreciate the equivalents to the above described structures.

Figure 3:
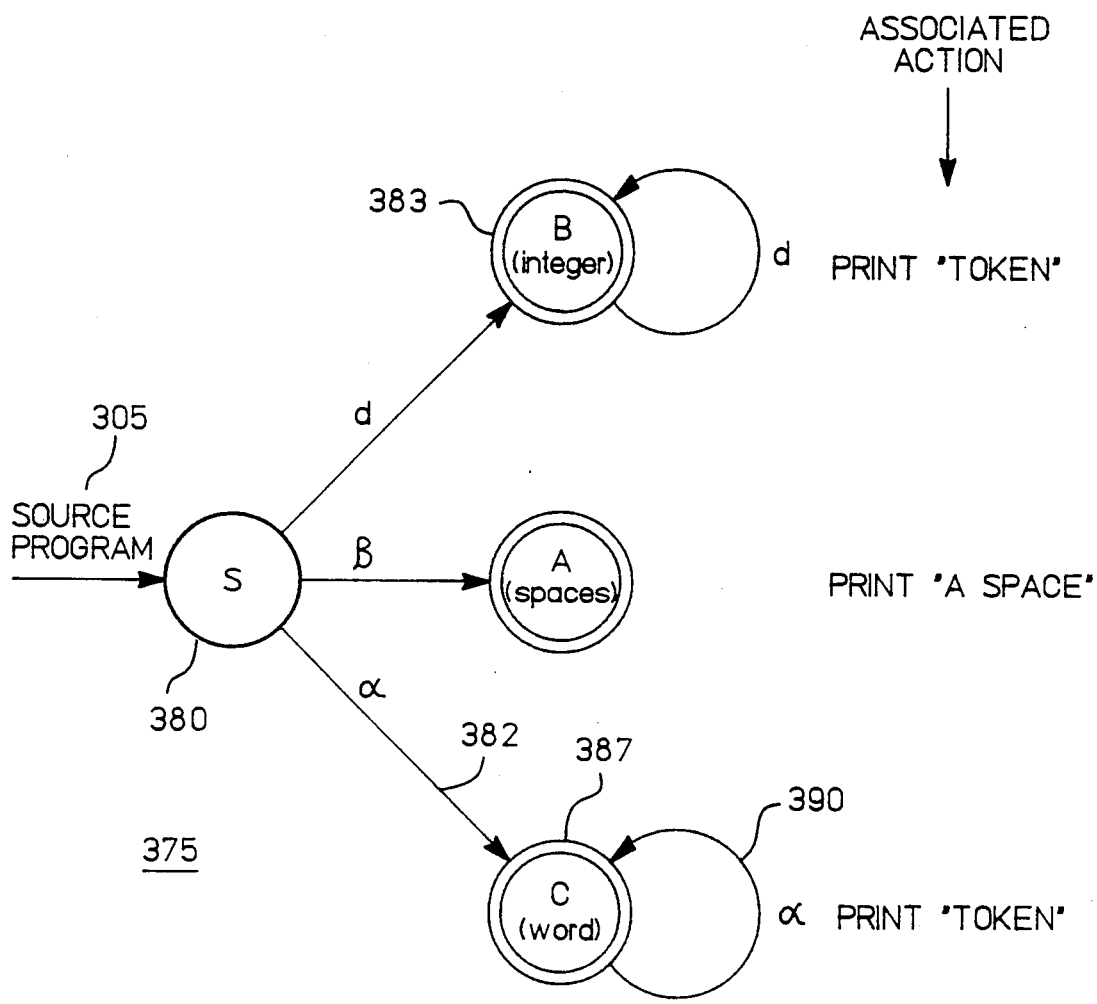
FIG. 3 is a sample finite state automata (FSA) that accepts an input given the regular definition $(\alpha|\beta|d)$.

FIG. 3 shows an example of a oversimplified lexical analyzer (in other words, a finite state machine) that "tokenizes" groups of words and/or numbers. Lexical analyzer 375 is designed to accept (in other words, perform the associated action) any sequence of numbers between 0-9 and/or any sequence of letters between A-Z (with the regular definition [α|β|d], where α represents the regular expression [A-Z], β represents a blank, and d represents the regular expression [0-9]) and provide the output shown in TABLE 1. The associated action is indicated to the right of each individual halt state. "Token" represents a global variable used to hold the token just recognized by lexical analyzer 375. The purpose of lexical analyzer 375 is to recognize numbers and words while filtering out spaces. It indicates a space has been filtered by outputing the string "a space".

TABLE 1

| Input: | HERE IS A 75 |
|---|---|
| Output: | HERE |
| | "a space" |
| | IS |
| | "a space" |
| | A |
| | "a space" |
| | 75 |

Lexical analyzer 375 starts its analysis of the input string in start state S 380. States B 383 and C 287 are called halt states or accepting states, and are so indicated by the double circles. The arrows connecting the states represent state transitions. Each one is labeled with a symbol recognized by the machine.

As each token in the input string is scanned, the machine moves from state to state, according to the symbols on the arrow. For example, in the input string "HERE IS A 75", since the first element in the string is an H, lexical analyzer 375 moves via transition line 382 from state S 380 to state C 387.

The lexical analyzer 375 continues its transitions until it either finishes the string (scans all the elements) or encounters an element that has no transition associated with it. Once the lexical analyzer 375 enters a halt state (B or C) it has located at least part of a token. In our example, as soon as it exits the halt state the associated action is performed (a more complex lexical analyzer might have a lookahead capabilities). For example, as stated earlier if the lexical analyzer 375 moves from state S 380 to state C 387 in response to the letter "H" it will remain in halt state C 387 via transition line 390 for letters "E", "R", and "E". It then will encounter a blank in the input string, thus the lexical analyzer 375 would halt, and print "HERE". Once the lexical analyzer 375 exits halt state C 390 the token representation of the lexeme "HERE" would be sent to the parser 220.

The present invention is concerned with determining whether an element in the string is an acceptable character, and if so, then present parser 220 with a token. In the above example, once lexical analyzer 375 scans "H" it checks to see if it is a legal character. Typically, lexical analyzer 375 checks a table for the letter "H". Since "H" can be represented by a single byte this does not present a problem for lexical analyzer 375.

However, a lexical analyzer that could recognize the string [扶 日 本 槻], may need to look up a combination of a single byte (e.g., spaces) and two byte characters. The table associated with a two byte character set would be prohibitively large and the lookup scheme would be complicated by the need to distinguish between single-byte and two byte character input.

III. Factoring Two Bytes Regular Expressions into One Byte Regular

Expressions

The present invention provides a system and method for factoring regular expression containing two byte characters into regular expressions containing single byte characters. Generally, lexical analyzers have, in the past, been built to recognize only characters that fall within the realm of single byte character sets. The basic problem is to translate an input specification that consists of regular expressions and associated actions into a lexical analyzer. This general process is well known to one skilled in the art of compiler design.

In the input specification, character classes can be used to describe a set of characters that are part of a regular expression. Character classes are denoted by a set of characters and/or character ranges surrounded by brackets ([]). For example, [abc] is used to recognize either the character "a", "b", or "c", or more specifically, the values 141, 142, and 143 which are the ASCII values for an "a", "b", and "c".

A range is specified by putting a hyphen (-) between two characters. The resulting range is all characters that fall between the two characters as well as the two characters themselves. For example, [a-t] recognizes all letters from "a" to "t", or more specifically, the values 141 through 164 which are the ASCII values for an "a" and a "t".

All of the characters discussed above can be represented by single byte values. The difficulty arises when two byte characters are used. A variety of character classes will contain two byte character, such as the HP15 character set used to represent Japanese. A character class may now look like [帰 紀 身], where [帰] is represented by the two bytes 139 and 65, [紀] is represented by the two bytes 139 and 73, and [倉] is represented by the two bytes 145 and 89. When the user types in a Japanese character on the screen, it is internally represented by a two bytes. Heretofore, a FSA would need to search an extremely large table in order to determine whether the typed in character corresponded to a valid next state transition in the finite state automata.

A. Character Class Procedure

Figure 4:
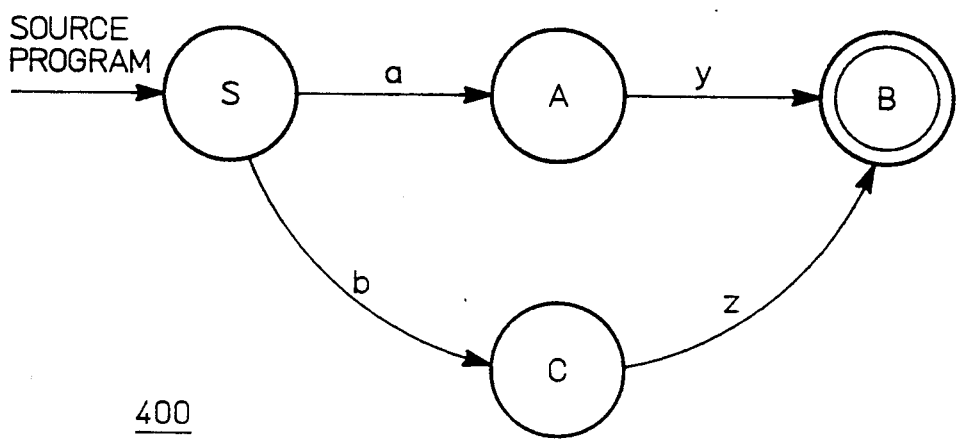
FIG. 4 is an example of a FSA which applies the character class procedure of the present invention by factoring a regular expressions with two byte character into a regular expressions with single byte characters.

The character class procedure is relatively simple. Given a character class [aybx], where a, y, b, and z are each single byte values and ay and bz are valid two byte characters, the character class procedure translates the character class into one that recognizes either ay or bz. This is denoted by "ay|bz". FIG. 4 shows an example of a finite state automata (FSA) 400 that recognizes the character class [aybz]. For example, [帰 倉] is translated into 139 (represented by a) followed by 65 (represented by y) or 145 (represented by b) followed by 89

(represented by z). Thus, any other characters that enter FSA 400 would not be accepted.

It now takes two state transitions to recognize the single byte representation, as opposed to the single state transition that would be required if the FSA had to recognize a character with a two byte representation. However, as will become apparent, the additional complexity in the FSA is overshadowed by the space savings in storing the transition table in memory.

B. Character Class Range Procedure

Translating a character class range is more difficult to translate into single byte representation than just a character class. Given a range [ay−bz], where a, b, y, and z are all 8-bit values and ay and bz are valid two byte characters, the character class range procedure consists of factoring the two byte ranges into an equivalent single byte representation. It should be noted that a, b, y, and z do not represent the letters in the English alphabet. They are only symbolic of an 8-bit value.

Figure 5:
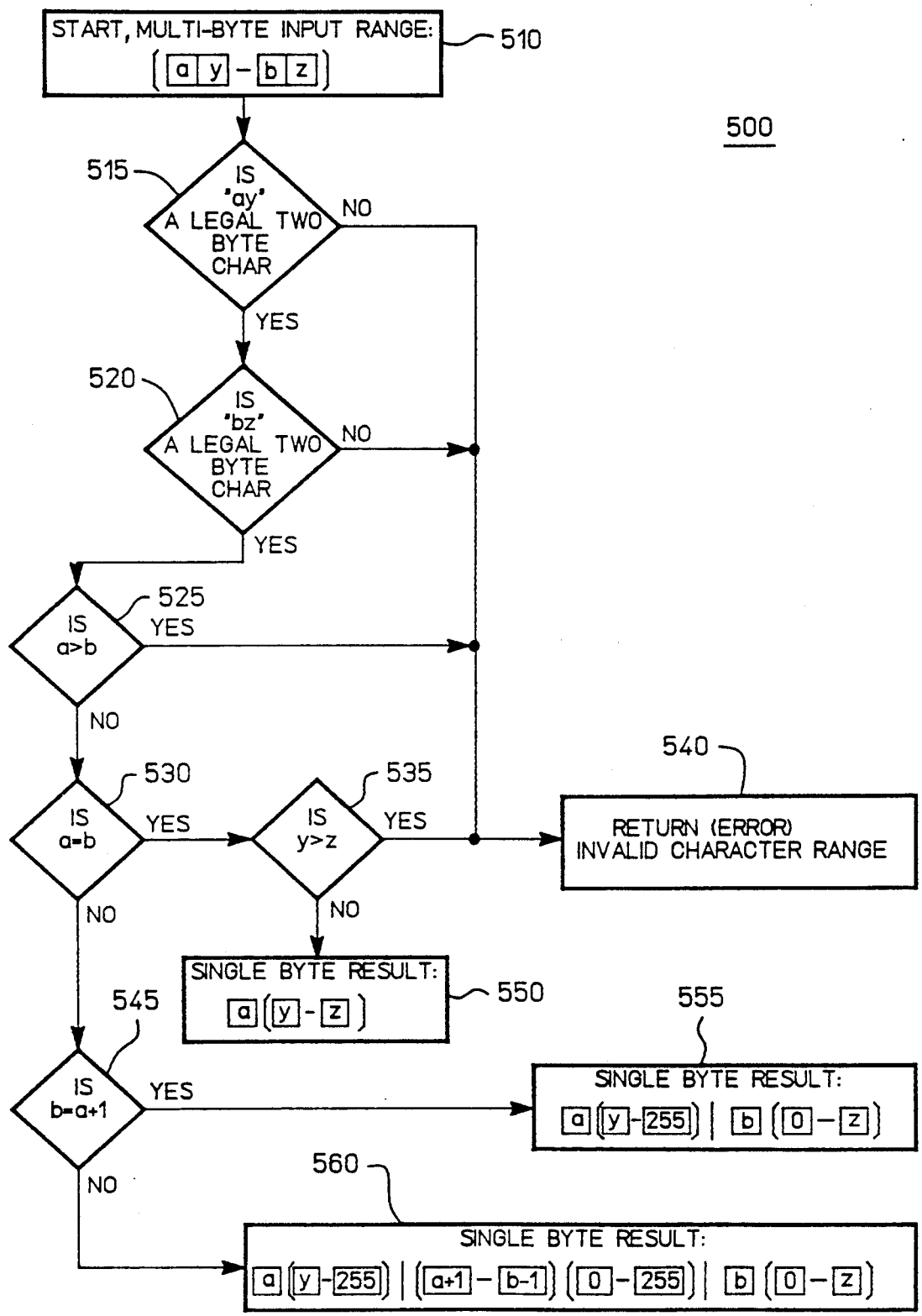
FIG. 5 is a flow chart of a character class range procedure 500 of the present invention.

Referring to FIG. 5, a flowchart of the character class range procedure 500 is shown. As shown in block 510, the multibyte input range [ay−bz] is given to the procedure 500 for manipulation. Block 515 checks the first two bytes of the first element in the character class range to determine whether it is a legal two byte character (i.e., is "ay" a legal first byte). If it is not legal character than an error message is given at block 540 signifying that an invalid character range has been given to the procedure 500. Otherwise, procedure 500 proceeds to block 520.

Block 520 checks the first two bytes of the last element in the character class range (i.e., bz) to determine whether it is a legal two byte character. If it is not a legal character then an error message is given at block 540 signifying that an invalid character range has been given to the procedure 500. Otherwise, procedure 500 proceeds to block 525.

Block 525 checks to determine whether the first byte of the first element is larger then the first byte of the last element, because a character class range must go from a smaller value to a larger value. If the first byte of the first element is not larger, then the procedure 500 proceeds to block 540. Once again, block 540 returns an error message since an invalid character range has been given to the procedure 500. Otherwise, procedure 500 proceeds to block 530.

Block 530, block 535, and block 545 are key steps in the character class procedure 500. Block 530 checks to determine whether the first byte of the first element is equal to the first byte of the last element. If it is then the procedure proceeds to block 535. Otherwise, the procedure proceeds to block 545.

Block 535 determines whether the second byte of the first element is larger then the second byte of the last element. If it is then procedure 500 return an error message at block 540. Otherwise procedure 500 translates the character range into the following single byte result:

$$a[y-z]. \tag{1}$$

Block 545 determines whether the first byte of the last element is equal to the first byte of the first element plus one. If it is equal, then procedure 500 translates the character range into a single byte result. The single byte representation being;

$$(a[y-255])|(b[0-z]). \tag{2}$$

The vertical bar here means "or," the parentheses are used to group subexpressions, and the juxtaposition of a with [y−255] means concatenation.

If, however, the first byte of the last element is not equal to the first byte of the first element plus one, then procedure 300 translates the character class range into the following single byte representation:

$$(a[y-255])|(((a+1)-(b-1))[0-255])|(b[0-z]). \tag{3}$$

The lexical analyzer uses the above results. Therefore, if the user asks for a range with two 16-bit characters, the range will be broken down into a single byte representation and then that representation will be used as an input to a single byte DFA. The following example will show the standard construction of a transition table both before and after the transformations provided by the present invention are applied. Moreover, the example will demonstrate the differing amount of storage space required to represent a transition table used in construction of a finite state machine.

Figure 8:
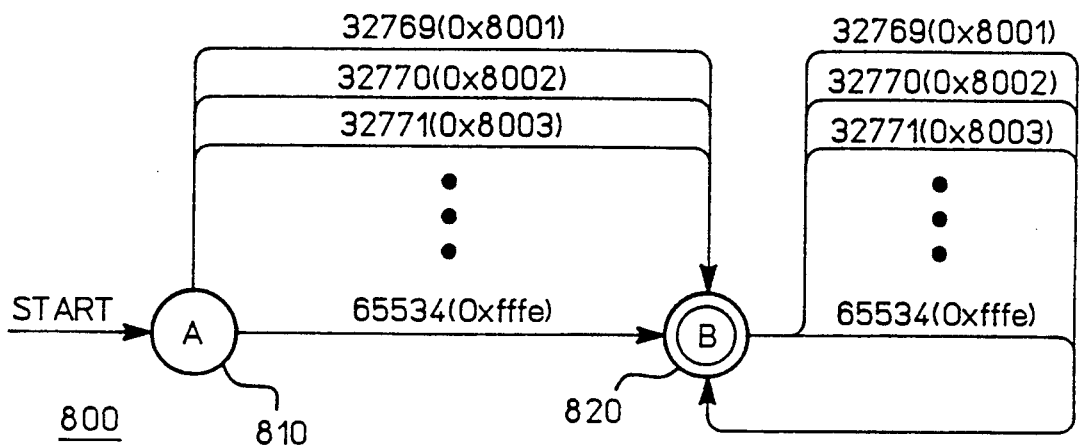
FIG. 8 is an example of a conventional FSA that accepts characters that are represented with two bytes of data.

Assume for this example that the value 32769 ($8001_{16}$) represents a valid Kanji character which is which is denoted by the ideogram 什 and that 65534 ($fffe_{16}$) represents a valid Kanji character which is denoted by the ideogram 丈. The sample regular expression for this example is [什−丈]+ which represents one or more occurrences of any of the characters in the given range. FIG. 8 and TABLE 2 show a finite state automata 800 and corresponding transition table, respectively, which would be generated using a conventional procedure (see Aho et al.).

The finite state automata (FSA) 800 has only two transition states: start state A 810 and halt state B 820. It checks every character in the input string to determine whether its two byte representation falls between the valid range (i.e., between $8001_{16}$-$fffe_{16}$). If the first character does fall within the valid range then there is a transition from start state A 810 to halt state B 820. Thereafter, every subsequent character is checked, and if it falls within the valid range then a state transition is made back to halt state B 820. As explained above, The FSA 800 continues its transitions until it either finishes the input string or encounters a token that has no transition associated with it. If it scans the entire input string (indicated by an end of file (EOF) character) and ends in halt state B 820, the string is accepted. On the other hand, if it scans the string but fails to end in a halt state, or if it is unable to scan the string because of a failure to find a matching transition on some token, then the FSA 800 fails to accept the string, and is said to block.

TABLE 2 shows the transition table that would be used in constructing the FSA 800. Since the Kanji characters are represented with two bytes of data, the table would have to have 65,537 entries. No compression is possible since no two or more states have identical actions for all given inputs. The total number of table entries requiring storage would be 131,074 since there are two states.

TABLE 2

| | Next Input Symbol | | | | | | | | |
|---|---|---|---|---|---|---|---|---|---|
| Decimal | 0 | 1 | ••• | 32768 | 32769 | 32770 | ••• | 65534 | 65535 | EOF |

TABLE 2-continued

| | Next Input Symbol | | | | | | | | |
|---|---|---|---|---|---|---|---|---|---|
| Hex | 0 × 0000 | 0 × 0001 | *** | 0 × 8000 | 0 × 8001 | 0 × 8002 | *** | 0 × fffe | 0 × ffff | |
| State A | error | error | *** | error | goto B | goto B | *** | goto B | error | error |
| B | error | error | *** | error | goto B | goto B | *** | goto B | error | ACCEPT |

Figure 9:
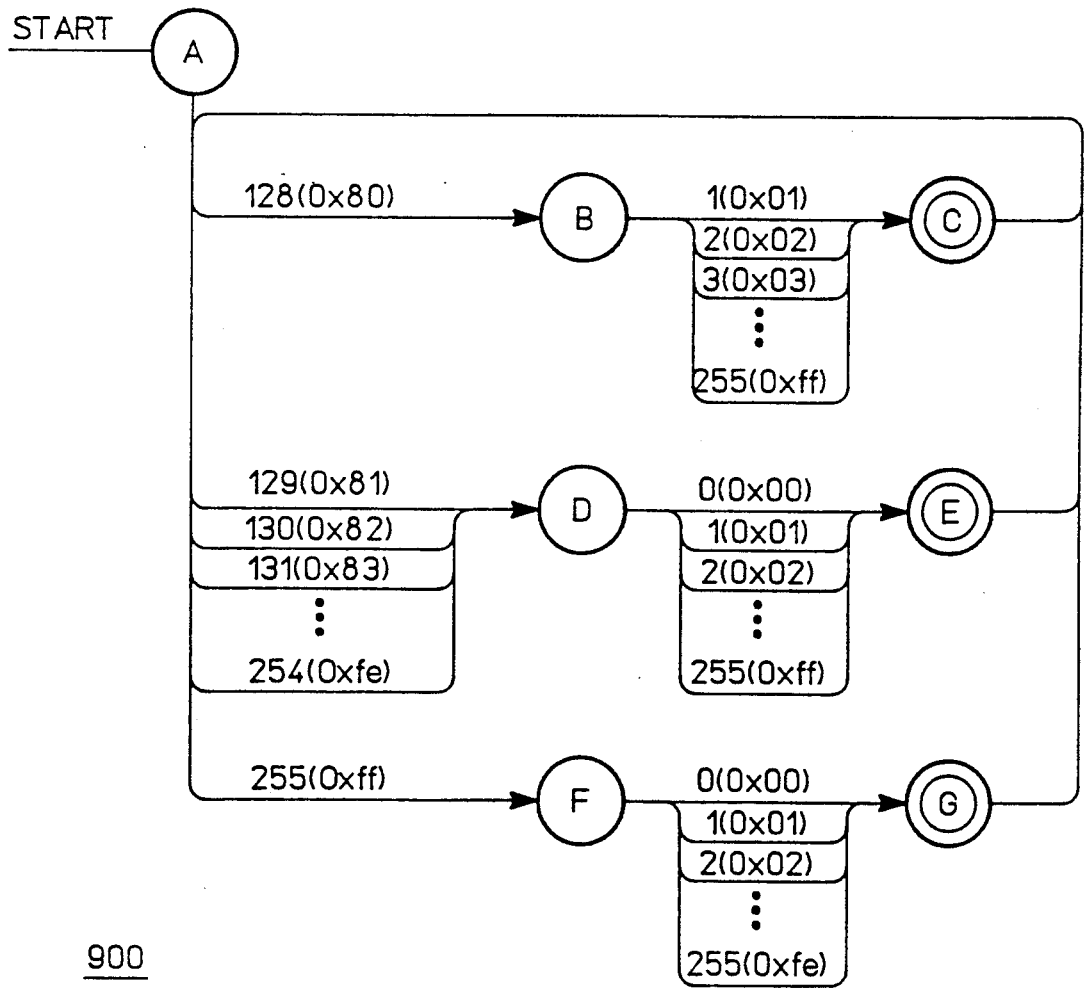
FIG. 9 is an example of a FSA that applies the character class range procedure 500 of the present invention by by factoring a regular expressions with two byte character into a regular expressions with single byte characters.

FIG. 9 shows an example of a FSA 800 which was constructed after the character class range procedure 500 of the present invention was applied to the character class range [ 亇-尹 ]. TABLE 3 shows the corresponding transition table for FSA 900. Specifically, the range [$8001_{16}$ - $fffe_{16}$] is translated to $80_{16}$ [$01_{16}$ - $ff_{16}$]$[$81_{16}$ - $fe_{16}$][$00_{16}$ - $ff_{16}$]$$ff_{16}$[$00_{16}$ - $fe_{16}$]. FSA 900 and the corresponding transition table readily follow.

rated into the above procedure if so desired.

Listed below are a number of standard compound ranges (character classes), that are mentioned for completeness.

The character class [a−i−z], where a, i, and z are single or two byte characters, would be translated into [a−z]. The character class [a−ij−z], where a, i, j, and z are single or two byte characters, would be translated into [a−i]|[j−z]. The character class [a−hij−z], where a, h, i, j and z are single or two byte characters, would be translated into [a−h]|i|[j−z]. Finally, the character class [a−hijk−z], where a, h, i, j, k, and z are single or two byte characters, would be translated into [a−h]|[i−j]|[k−z]. After the above noted translations, procedures 500 and/or 600 would be applied as needed to any ranges that contained two byte characters.

Ranges can be found in the middle of a character class. This requires separating the normal character classes from the ranges and "or"ing them together. For example, if the character range procedure 500 was given the two byte character class range [ac−xz], where a, c, x, and z are all two byte characters (a single variable is used for the two byte characters for purposes of simplicity), the range would initially be divided into:

$$[az]|[c-x]. \quad (5)$$

TABLE 3

| | Next Input Symbol | | | | | | | | |
|---|---|---|---|---|---|---|---|---|---|
| Decimal | 0 | 1 | *** | 127 | 128 | 129 | *** | 254 | 255 | EOF |
| Hex | 0 × 00 | 0 × 01 | | 0 × 7f | 0 × 80 | 0 × 81 | | 0 × fe | 0 × ff | |
| State A | error | error | *** | error | goto B | goto D | *** | goto D | goto F | error |
| B | error | goto C | *** | goto C | goto C | goto C | *** | goto C | goto C | error |
| C | error | error | *** | error | goto B | goto D | *** | goto D | goto F | ACCEPT |
| D | goto E | goto E | *** | goto E | goto E | goto E | *** | goto E | goto E | error |
| E | error | error | *** | error | goto B | goto D | *** | goto D | goto F | ACCEPT |
| F | goto G | goto G | *** | goto G | goto G | goto G | *** | goto G | error | error |
| G | error | error | | error | goto B | goto D | | goto D | goto F | ACCEPT |

Furthermore, table compression is possible for the transition table for FSA 900 since halt states C, E, and G have identical actions for all given inputs. Standard methods for table compression can be found in Aho, et al. The resulting compressed table is shown in TABLE 4. States C, E, and G have been compressed into a single state C. State F has become state E. Although FSA 900 is more complicated then FSA 800, the transition table for FSA 900 is substantially smaller then the transition table for FSA 900. Consequently, since the Kanji characters can now be represented with single bytes, the transition table only needs 257 columns. After the compression is completed, there are only 1,285 entries requiring storage in memory. The transformations described above have reduced the memory storage requirement for representing the transition table in this example from 131,074 to 1,285. In other words, in this example, the present invention has achieved a 99.02% memory savings.

TABLE 4

| | Next Input Symbol | | | | | | | | |
|---|---|---|---|---|---|---|---|---|---|
| Decimal | 0 | 1 | *** | 127 | 128 | 129 | *** | 254 | 255 | EOF |
| Hex | 0 × 00 | 0 × 01 | | 0 × 7f | 0 × 80 | 0 × 81 | | 0 × fe | 0 × ff | |
| State A | error | error | *** | error | goto B | goto D | *** | goto D | goto E | error |
| B | error | goto C | *** | goto C | goto C | goto C | *** | goto C | goto C | error |
| C | error | error | *** | error | goto B | goto D | *** | goto D | goto E | ACCEPT |
| D | goto C | goto C | *** | goto C | goto C | goto C | *** | goto C | goto C | error |
| E | goto C | goto C | | goto C | goto C | goto C | | goto C | error | error |

C. Compound Character Class/Range Procedure

Figure 6:
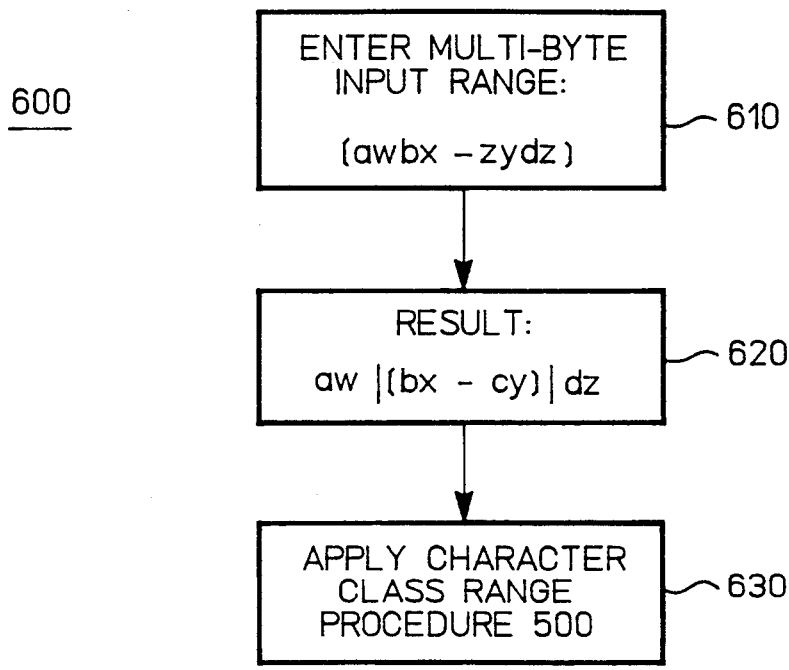
FIG. 6 is a flow chart of a compound character class/range procedure 600 of the present invention.

Referring to FIG. 6, a flowchart of the character class/range procedure 600 is shown. As shown in block 610, the compound multi-byte character class range [awbx−cydz] is given to procedure 600, where aw, bx, cy, and dz are valid two byte characters. In block 620, the compound character class/range procedure 600 translates the given character class into:

$$aw|[bx-cy]|dz. \quad (4)$$

Next, the character class range procedure 500 described above is applied to the second term ([bx−cy]) in representation (4). Resulting in a single byte representation. Of course, additional error checking could be incorpo- Next, the character class range procedure 500 described above is applied to the character class range [c−x].

E. Universal Character Construction

Another notation used in the creation of a lexical analyzer is the "universal character." This is represented by a period ".". It is used to represent all legal characters. When a period is found it indicates that any valid character is to be recognized at that location.

Figure 7:
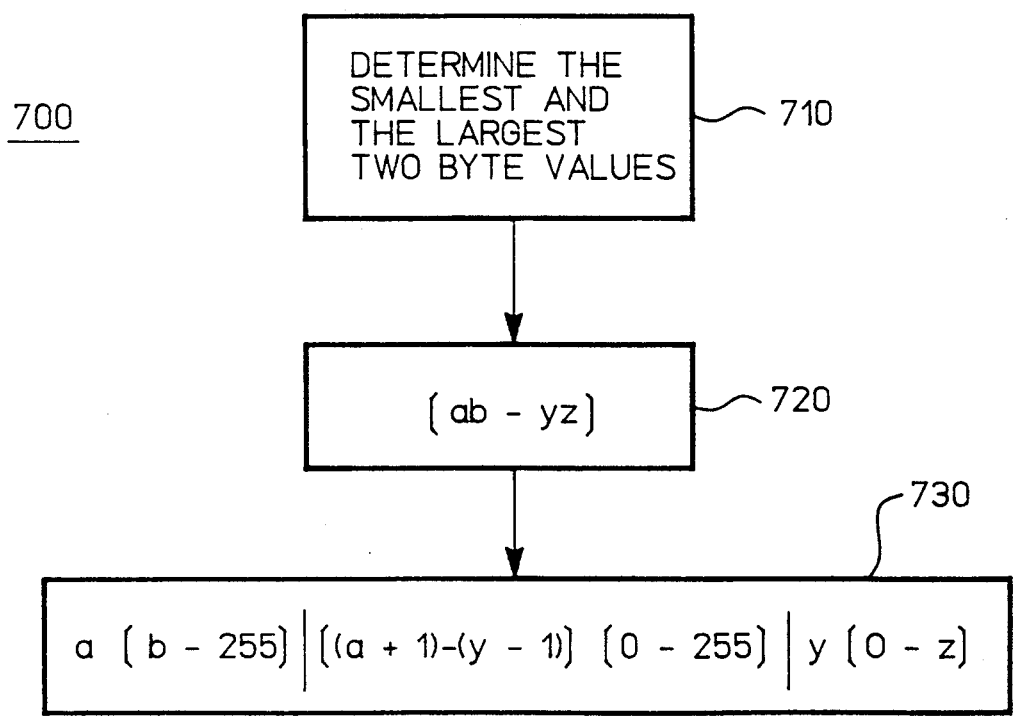
FIG. 7 is a flow chart of a universal character range construction procedure 700 of the present invention.

Referring to FIG. 7, a procedure 700 for constructing a universal character is shown. Initially, as shown in block 710, the procedure 700 will find the values of the smallest valid two byte character and the largest valid two byte character within a specified language. Block 720 establishes a range between the two by using, for example, a table lookup. Let ab represent the smallest legal two byte character in the character set and let yz be the largest legal two byte character in the character set. Therefore, a is the first byte of the smallest legal two byte character, b is the second byte of the smallest legal two byte character, y is the first byte of the largest legal two byte character, and z is the second byte of the largest legal two byte character.

Based on the character class range procedure 500 described above, the character class range [ab−yz] is factored into:

$$a[b-255]|[(a+1)-(y-1)][0-255]|y[0-z], \quad (6)$$

as shown in block 730.

Another advantage of the present invention is that it simplifies the problem of creating a lexical analyzer that understands a combination of both single and multi-byte characters. Since all regular expressions of two byte characters are broken down into corresponding regular expressions consisting of only single byte characters. In addition, the underlying scanner generator only has to build tables and an engine for single byte characters.

The teaching of the present invention are clearly applicable to a variety of fields within compiler design and outside of compiler design. It is contemplated that the present invention will be used in any, and all, symbol recognition environments. As long as information is being represented by a muli-byte value, the present invention provides a mechanism of reducing the memory needed to recognize the information. For example, the techniques described above to build a lexical analyzer can be applied to areas such as general text editing, context sensitive text editing, syntax directed text editing, grammar recognition, grammar correction, and spelling applications, just to name a few. In each application, the underlying problem is the specification and design of programs that execute actions triggered by paterns in strings of characters.

Although the above discussion relates directly to factoring regular expressions containing at least one two byte character, it is contemplated that the teachings of the present invention will be directed at factoring regular expressions containing characters represented by more then two bytes. One skilled in the art could readily apply the teachings of the present invention to factor regular expressions containing characters from multibyte character sets, and subsequently, build a lexical analyzer that can scan multibyte character sets.

While the invention has been particularly shown and described with reference to preferred embodiments thereof, it will be understood by those skilled in the art that various changes in form and details may be made therein without departing from the spirit and scope of the invention.

We claim:

1. A computer-based system for building a lexical analyzer that can recognize a character set that is represented by both single byte values and multibyte values or only multibyte values, comprising:
   (a) generating means for building a lexical analyzer, said generating means configured to accept an input specification that includes at least one regular expression having at least one multibyte character;
   (b) factoring means for factoring said regular expression into a single byte representation if said regular expression contains at least one multibyte character.

2. The system of claim 1, further comprises compiler means for compiling said lexical analyzer into an efficient finite state automata for said factored regular expression.

3. The system of claim 1, wherein said factoring means is configured to factor a character range having a form (aybz), where ay and bz are valid two byte characters, into (ay|bz).

4. The system of claim 1, wherein said factoring means is configured to factor a character range having a form (ay−bz), where ay and bz are valid two byte characters, into (a(y−z)) if a first byte of first character in said character range is equal to a first byte of the last character in said character range and if a last byte character is greater than the last byte of the last character.

5. The system of claim 1, wherein said factoring means is configured to factor a character range having a form (ay−bz), where ay and bz are valid two byte characters, into (a(y−255))|(b(0−z)) if a first byte of the first character in said character range is not equal to a first byte of the last character in said character range and if said first byte of the last character in said character range is equal to said first byte of the first character in said character range plus one.

6. The system of claim 1, wherein said factoring means is configured to factor a character range having a form (ay−bz), where ay and bz are valid two byte characters, into (a(y−255))|(-((a+1)−(b−1)(0−255))|(b(0−z)) if a first byte of the first character in said character range is not equal to a first byte of the last character in said character range and if said first byte of the last character in said character range is not equal to said first byte of the first character in said character range plus one.

7. The system of claim 1, wherein said factoring means further comprises error checking means for checking said regular expression to determine if it contains valid characters.

8. The system of claim 1, further comprises universal means for generating a universal character class for a multibyte character set, wherein said universal means comprises means for determining the smallest and the largest multibyte values, wherein said multibyte value represents a valid character, and forming a regular expression having a form (ay−bz), whereby said regular expression (ay−bz) represents a range including the smallest and the largest multibyte values.

9. A computer-based method for building a lexical analyzer that can recognize a character set that has both single byte and multibyte characters or only multibyte characters, comprising the steps of:
   (1) receiving an input specification, said input specification includes at least one regular expression having at least one multibyte character;
   (2) factoring said at least one regular expression into a single byte representation; and
   (3) building a lexical analyzer based on said factored regular expression, whereby said lexical analyzer can scan a two byte character set.

10. The method of claim 9, further comprising the steps of:
   (1) compiling said lexical analyzer, wherein said compiled lexical analyzer is an efficient finite state automata for said factored regular expression;
   (2) entering a sequence of characters into said compiled lexical analyzer; and
   (3) analyzing said sequence of characters in relation to said factored regular expression.

11. The method of claim 9, wherein said factoring step factors a character range having the form (aybz) into (ay|bz), where ay and bz are valid two byte characters.

12. The computer-based method of claim 9, wherein said building step comprises constructing a transition table based on said single byte representation.

13. The computer-based method of claim 10, wherein said analyzing step further comprises the step of producing a token stream from said sequence of symbols.

14. The computer-based method of claim 13, further comprises the step of providing said token stream to a parser.

15. The method of claim 9, wherein said factoring step factors a character range having a form (ay−bz) into (a(y−z) if a first byte of the first character in said character range is equal to a first byte of the last character in said character range and if a last byte of the first character is greater than the last byte of the last character.

16. The method of claim 9, wherein said factoring step factors a character range having a form (ay−bz) into (a(y−255))|(b(0−z) if a first byte of the first character in said character range is not equal to a first byte of the last character in said character range and if said first byte of the last character in said character range is equal to said first byte of the first character in said character range plus one.

17. The method of claim 9, wherein said factoring step factors a character range having a form (ay−bz) into (a(y−255))|(((a+1)−(b−1))(0−255)|(b(0−z)) if a first byte of the first character in said character range is not equal to a first byte of the last character in said character range and if said first byte of the last character in said character range is not equal to said first byte of the first character in said character range plus one.

18. The method of claim 9, further comprises a step of generating a universal character class, comprising the steps of, (a) determining the smallest and the largest valid two byte values, and
(b) forming a regular expression having the form (ay−bz), wherein ay is the smallest two byte value and bz is the largest two byte value.

19. The method of claim 9, wherein said factoring step factors the regular expression (awbx−cydz) into (aw|(bx−cy)|dz).

20. A method of factoring a regular expression with a two byte character class range into a regular expression with a single byte character class range, were the character class range is of the form [ay−bz], where a, b, y, and z are single byte values, the method comprising the steps of:

(a) determining whether said first byte of the first character is equal to said first byte of the last character, and if it is then producing an error signal if a last byte of the last character is greater then a last byte of the first character, otherwise factoring the character class range into (a[y−z]); and
(b) determining whether said first byte of the last character is equal to said first byte of the first character plus one, and if it is equal then factoring the character class range into (a[y−255])|(b[0−z]), and if it is not equal then factoring the character class range into (a[y−255])|(-[(a+1)−(b−1)][0−255]|(b[0−z]).

21. A computer-based system for building a lexical analyzer that can recognize a character set that is represented by both single byte values and multibyte values or only multibyte values, comprising:

(a) input means for accepting an input specification that includes at least one regular expression having at least one multibyte character;
(b) factoring means for factoring said regular expression into a single byte representation if said regular expression contains at least one multibyte character; and
(c) generating means for building a lexical analyzer for said factored regular expression.

* * * * *